Figure 10:
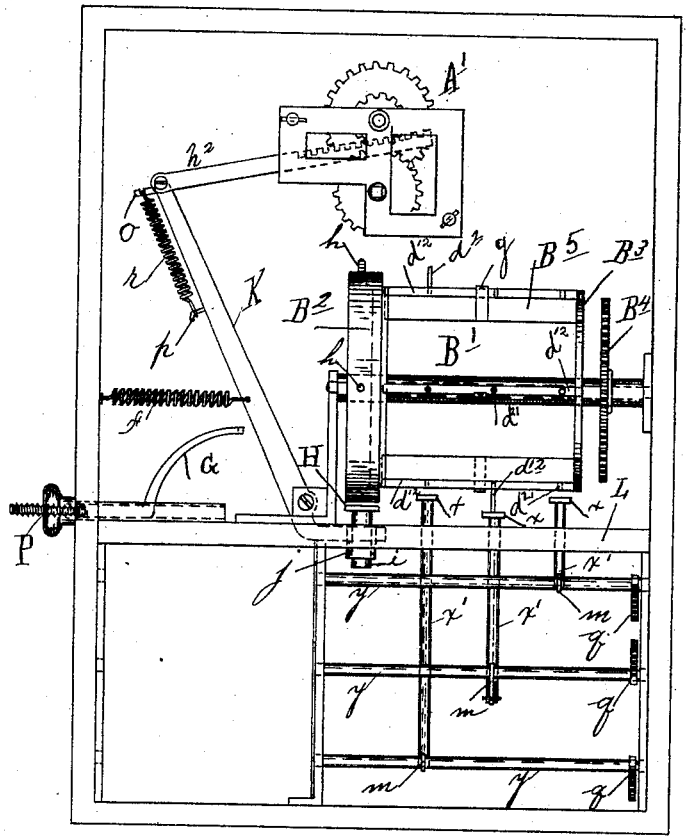

3 Sheets—Sheet 1.
L. DART.
Automatic Time-Table Annunciator.
No. 196,637. Patented Oct. 30, 1877.
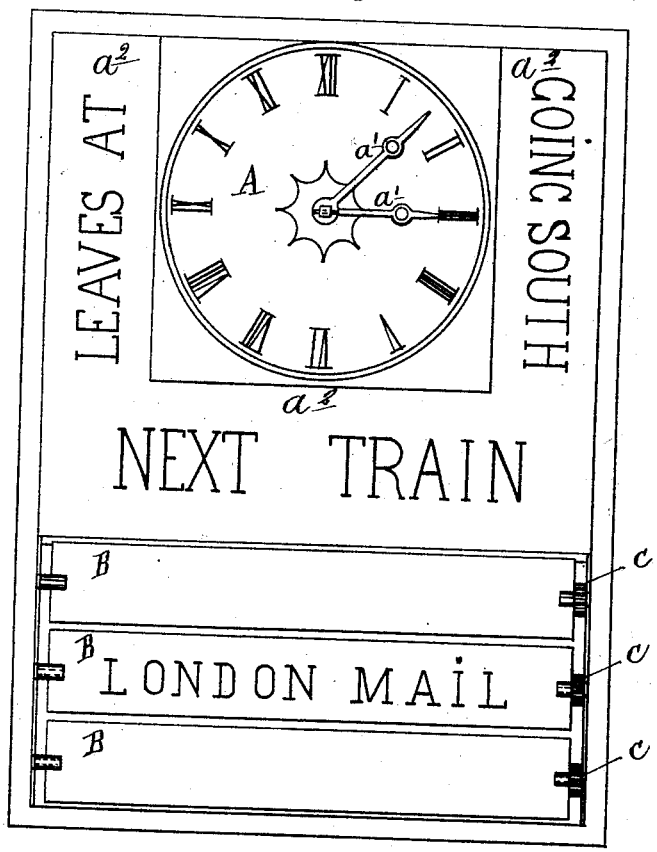
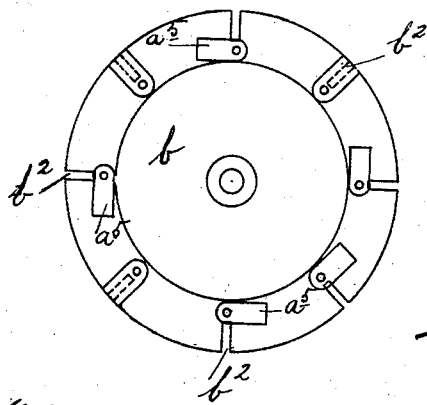
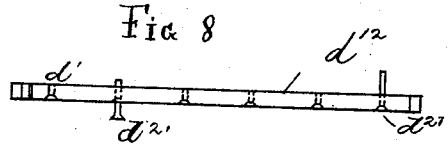
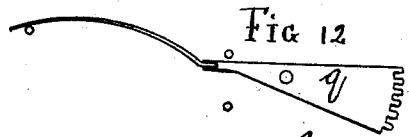
Witnesses
H. A. Chapin
Wm H Chapin
Inventor
Lewis Dart
By Chapin &c
Attorney
N. PETERS, PHOTO-LITHOGRAPHER, WASHINGTON, D. C.

3 Sheets—Sheet 2.

L. DART.
Automatic Time-Table Annunciator.

No. 196,637. Patented Oct. 30, 1877.

Witnesses
H. A. Chapin
Wm. H. Chapin

Inventor
Lewis Dart
By Chapin & Co
Attorneys

3 Sheets—Sheet 3.
L. DART.
Automatic Time-Table Annunciator.
No. 196,637. Patented Oct. 30, 1877.
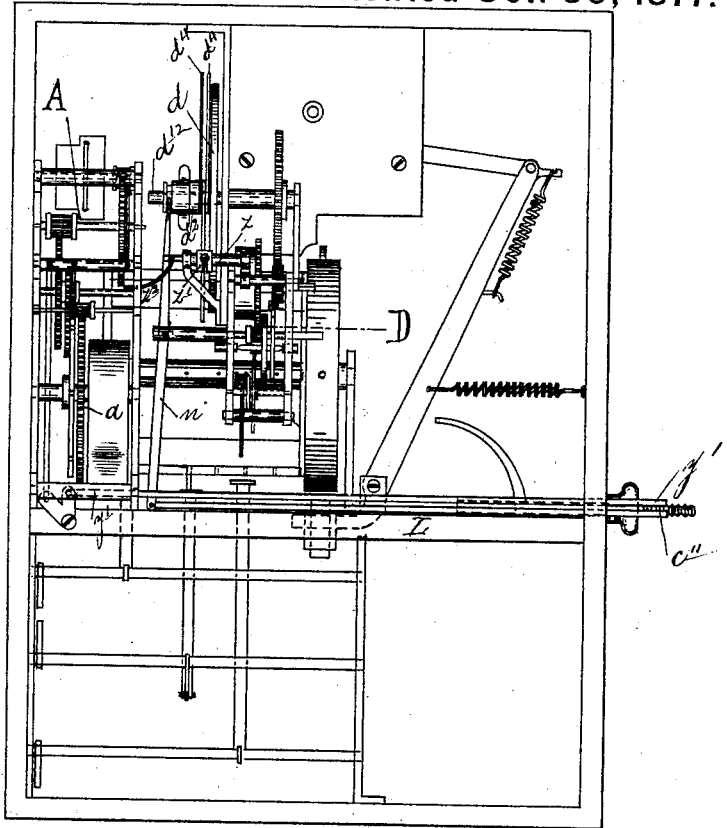
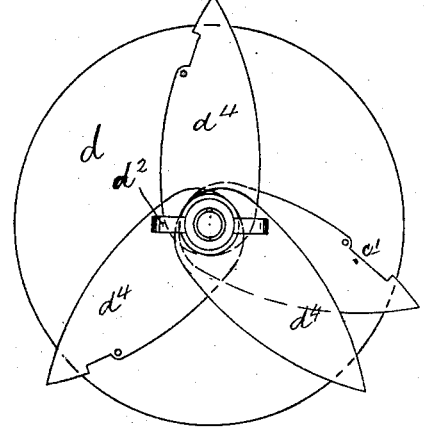
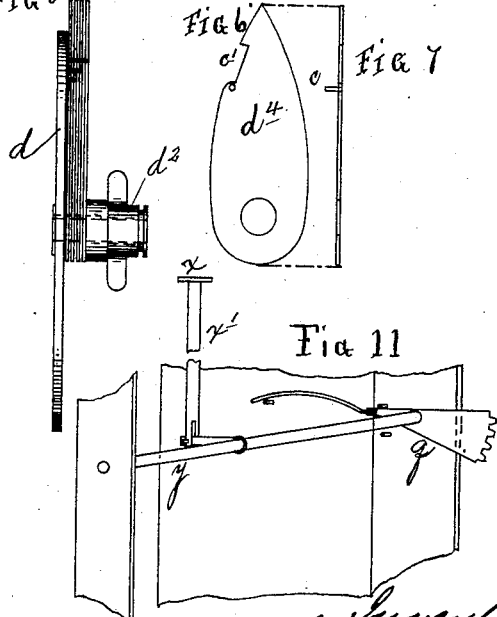
Witnesses
H. A. Chapin
Wm. H. Chapin
Inventor
Lewis Dart
By Chapin &
Attorney

UNITED STATES PATENT OFFICE.

LEWIS DART, OF SPRINGFIELD, MASS., ASSIGNOR TO HIMSELF, HORACE W. BULLOCK, AND ORVIS W. BULLOCK, OF SAME PLACE.

IMPROVEMENT IN AUTOMATIC TIME-TABLE ANNUNCIATORS.

Specification forming part of Letters Patent No. 196,637, dated October 30, 1877; application filed March 14, 1877.

*To all whom it may concern:*

Be it known that I, LEWIS DART, of Springfield, county of Hampden and State of Massachusetts, have invented a new combination of mechanical devices, which I call an "Automatic Time-Table Annunciator," which is fully set forth in the following specification and drawings.

The object of my invention is to provide, for the use of railroad and transportation companies, hotels, schools, or any parties requiring the announcement of a systematic schedule or time-table, an instrument capable of being so adjusted as to regularly announce any desired programme. Said instrument may be adjusted to announce events in rapid succession, and as frequently as may be desired.

In the drawings, (which consist of three plates and twelve figures,) Figure 1, Plate 1, is a front elevation of the instrument, showing its exterior parts. Fig. 2, Plate 2, is a front elevation with the hands, dial, and reversible slats removed, showing the interior working parts as seen from that side. Fig. 3, Plate 3, is a rear elevation, showing the working parts of the interior as seen from that side. Fig. 4, Plate 3, is a face view of disk $d$, train D, Fig. 3, Plate 3, showing the arrangement of its time-dividing arms $d^1$ upon its face, and end view of nut $d^2$. Fig. 5, Plate 3, is a vertical edge view of disk $d$, Fig. 3, train D with its time-dividing arms all grouped into one point, in which position they would cause the instrument to make but one indication in twenty-four hours, and the groove on nut $d^2$. Fig. 6, Plate 3, is a face view of one of the arms $d^1$ of disk $d$ detached from the disk, and showing slot $c'$ cut on its edge. Fig. 7, Plate 3, is a vertical edge view of one of arms $d^1$, showing its pin $c$. Fig. 8, Plate 1, is a longitudinal view of one of the pin-bars $d^{12}$, Fig. 2, Plate 2, showing the arrangement of pin-holes $d^1$ and one of pins $d^{21}$ in the bar, and one partly lifted out. Fig. 9, Plate 1, is a face view of disk $b$ attached to the side of main gear-wheel in train A, Fig. 3, Plate 3, showing the slots $b^2$ in its periphery, and the closing-latches $a^5$. Fig. 10, Plate 2, is an elevation of the rim-head B$^2$ on skeleton cylinder B$^1$, Fig. 2, showing the adjusting-screws $h$ for piston $i$, Fig. 2, Plate 2. Fig. 11, Plate 3, is an elevation of one of pedals $x$, Fig. 2, Plate 2, its upright rod $x'$, horizontal rod $y$, and sector $q$. Fig. 12, Plate 1, is a flat-side view of one of sectors $q$.

In Fig. 1, Plate 1, A is an ordinary clock-dial. $a^1\ a^1$ are ordinary clock-hands, which are moved by mechanism, hereinafter to be described, to any required position over dial A, either backward or forward. Surrounding the dial A are lettered borders $a^2\ a^2\ a^2$, so placed for the purpose of giving information relative to the indications of the instrument. B B B are reversible sign-slats pivoted at each end, and upon the sides of which are shown words or sentences for giving information intended to be shown by the operations of the instrument, three only of which are shown; but they may be multiplied indefinitely, or to an extent sufficient to announce any number of trains that a road may wish to run, and to state their character and destination. On the right-hand end of slats B B B are shown pivoted pinions $c\ c\ c$, which engage in geared sectors set behind them, and by which the slats are reversed.

In Fig. 2, Plate 2, A' is a train of geared wheels, which are caused to revolve by mechanisms hereinafter described, and which are so arranged as to impart the requisite rotary motion to the hands $a^2\ a^2$, Fig. 1, Plate 1, and so designate hours and minutes upon the dial.

L, Fig. 2, Plate 2, is a shelf in the case supporting a part of the mechanism of this instrument.

B$^1$, Fig. 2, Plate 2, is a skeleton cylinder running upon proper bearings, carrying upon its center shaft heads B$^2$ B$^3$ and gear-wheel B$^4$. B$^5$ B$^5$ B$^5$ B$^5$ are bars running lengthwise with cylinder B$^1$, and permanently attached to the heads B$^2$ B$^3$, their edges terminating near the periphery of said heads.

$d^{12}\ d^{12}\ d^{12}\ d^{12}$ are movable pedal-pin bars, attached to the edges of bars B$^5$ by a flat spring, $g$, and are prevented from moving laterally by letting their ends rest in the top portion of the slots in heads B$^2$ B$^3$, in which are placed and held bars B$^5$.

Bars $d^{12}\ d^{12}\ d^{12}\ d^{12}$ are perforated with pin-holes $d^1$ equidistant with the position of the pedals $x\ x\ x$ under the cylinder.

$d^{21}$ are pins in bars $d^{12}\ d^{12}\ d^{12}\ d^{12}$, the points of which engage upon and press down pedals $x\ x\ x$. Pins $d^{21}$ fit loosely in bars $d^{12}\ d^{12}\ d^{12}\ d^{12}$, and may be placed in different holes $d^1$, according to the pedals they may be required to act upon.

Cylinder-head $B^2$ has an outwardly-projecting rim, through which, from the inner side, are put adjusting-screws $h$, one opposite the end of each of the bars $B^5$.

H is a narrow plate under cylinder-head $B^2$, and is attached to the top of a piston, $i$, the bottom end of the latter being slotted.

In shelf L, under cylinder-head $B^2$, is set a metal socket, $j$, in which piston $i$ has a reciprocating vertical movement.

K is a lever, hung near the shelf L, having a short arm on its lower end, the end of which engages in the slotted end of piston $i$, and to its upper end is attached a flexible rack-arm, $h^2$, having a rack cut on its edge, which engages in a pinion on one of the arbors in the train A', Fig. 2, Plate 2. The long arm $h^2$ has a hook-shaped projection, $o$, bending upon its end near lever K. On lever K is a hook, $p$. Spiral spring $r$, being attached to $o$ and $p$, serves to keep the rack on arm $h^2$ closely against the pinion in train A', so as to prevent lost motion. Spiral spring $f$ is attached to lever K and to the case, so as to cause lever K to recede after having moved forward toward train A'.

G is an arm adjustable against lever K by a screw, P, Plate 2, Fig. 2, outside of the case, for the purpose of arbitrarily adjusting the hands on dial A.

$x\ x\ x$ are horizontal pedal-plates, attached to the top ends of vertical rods $x'\ x'\ x'$, which pass down through shelf L. Under this shelf are three horizontal rods, $y\ y\ y$, suitably supported at each end so as to permit a rotary motion. On rods $y\ y\ y$ are arms $m\ m\ m$, to which the bottom ends of vertical rods $x'\ x'\ x'$ are loosely attached by pins.

On one end of each of the rods $y\ y\ y$ are placed geared sectors $q$, which engage in the pivoted pinions $c\ c\ c$, and so reverse the signal-slats B B B by the rotary motion of rods $y\ y\ y$. The geared sectors $q$ terminate on the rear ends in a slim spring, the end of which is attached to the case to give a reverse motion to the sectors to that given them by the rods $y\ y\ y$ in descending, and so to reverse the slats after the pedal-plates have been released by the passage of the pedal-pins from their surface.

In Fig. 3, Plate 3, A is a train of wheels similar to an ordinary striking-train in an eight-day clock-movement, in which the main gear-wheel $a$ is made to engage in and turn the gear-wheel $B^4$ on the shaft to cylinder $B^1$, Fig. 2, Plate 2.

The train A is let off and stopped by the employment of ordinary clock-striking devices in combination with a thin disk, $b$, which is permanently attached to the side of main gear-wheel $a$, but setting off a little from it to allow the stop-lever to drop freely into slots $b^2$, Fig. 9, Plate 1, cut in its periphery in lines radiating from its center. The number of slots cut in disk $b$ is the same as the number of the bars $B^5$ in cylinder $B^1$, Fig. 2, Plate 2—that is to say, the number of slots $b^5$ left open is the same as the number of operating bars on the cylinder, the distance between the slots being so calculated that the drop-wire that stops the train will be held up until cylinder $B^1$, Fig. 2, has completed so much of its revolution as may be necessary to have caused the required indications of the instrument through the medium of the hands upon the dial and the reversible slats. Said slots $b^2$ in disk $b$ are provided with closing-latches $a^5$, for the purpose of preventing the action of the drop-wire to stop cylinder $B^1$, Fig. 2, when there is no pedal-pin bar in it.

D, Fig. 3, Plate 3, is a train of gear-wheels and other devices, combining the peculiar adjustable time-dividing mechanism of the instrument, and is set in motion and run by an ordinary time-piece movement.

The peculiar devices above alluded to consist of a disk, $d$, Figs. 3, 4, and 5, Plate 3, which revolves once in twenty-four hours, and which is attached to a hollow hub. Said hub has a free longitudinal movement upon an arbor, $d^{10}$, Fig. 3, which arbor is revolved by the above-named time-piece movement through the medium of gear-wheels. Said hollow hub is caused to revolve with arbor $d^{10}$ by the interposition of an ordinary spline and key between them. Said hollow hub has a thread cut on a portion of its exterior, near its outer end, to receive a nut, $d^2$, which has a groove cut around it to receive the bifurcated end of a lever, $n$.

Revolved by disk $d$ are adjustable flat arms, $d^4$, Fig. 4, Plate 3, pierced at one end and placed on arbor $d^{10}$, and terminating in pointed ends beyond the outside edge of disk $d$. Said arms $d^4$, the operating number of which should equal the number of operative bars $d$, Fig. 8, Plate 1, on bars $B^5$ in cylinder $B^1$, Fig. 2, Plate 2, are held in any required position against the face of disk $d$ by the screw-nut $d^2$, after having been adjusted to the requisite time-divisions. Also, attached to the face of each arm $d^4$, next to disk $d$, near the periphery of $d$, is a short pin, $c$, so placed for the purpose of more firmly holding arms $d^4$ while adjusting them to different positions on disk $d$.

Arms $d^4$ have cut on one edge, next to pin $c$, a slot, $c^1$, Fig. 6, Plate 3, to permit of folding the arms $d^4$ all together, as shown in Fig. 5, Plate 3, so that they will act as one, it being necessary for that purpose to provide a place into which each pin can retire as the arms are folded together.

Bifurcated lever $n$, Fig. 3, Plate 3, engages in the end of nut $d^2$ in the groove cut therein, and has its fulcrum-point at a convenient point below. Attached to its lower end is a rod, $c^{11}$, running to the outside of the case, by which lever $n$ is moved, and causes the hollow hub, to which is attached disk $d$ and arms $d^4$, to move lodgitudinally on arbor $d^{10}$, for purposes hereinafter to be specified.

Train D, Fig. 3, Plate 3, has attached to it an arbor, $z$, lying at right angles to the edge of disk $d$, and hung in suitable bearings, so as to permit it to have an oscillating movement. On this arbor, opposite to the end of arms $d^4$, on the face of disk $d$, is a slide-catch, $z^1$, attached to $z$ by a screw, and adjustable to or from disk $d$ for the purpose of engaging more or less against the points of the arms $d^4$, so that the points of said arms may lift up against the end of said slide-catch $z^1$, and so slightly turn arbor $z$ as the points of said arms move up in revolving with disk $d$.

On or near the end of arbor $z$, toward train A, Fig. 3, Plate 3, is attached a bent elbow-shaped wire, $z^2$, the free end of which extends into train A for the purpose of unlocking the latter train.

Horizontal rod $y'$, Fig. 3, Plate 3, extends from the outside of the case and into the same, and terminates under train A, where the end of it is attached to an elbow hung on the edge of shelf L. To the other end of the elbow is attached a vertical trip-wire for moving the train arbitrarily.

The operation of the instrument composed of the before-mentioned parts and devices is as follows, viz: We will suppose, for instance, that it becomes necessary to adjust this instrument to announce the departure of four railway-trains within any given time. The first operation is to remove the disk $d$ from arbor $d^{10}$, Fig. 3, train D, Plate 3, and, after loosening nut $d^2$, to adjust the points of arms $d^4$ at the proper time-divisions around the circumference of disk $d$, which is done by placing said disk on a proper scale arranged for this purpose, and, after having done this, screw down nut $d^2$ and secure them in position. Disk $d$ may then be replaced upon its arbor. Arms $d^4$ may also be adjusted to their proper time-divisions without removing disk $d$ from its arbor, but said adjustments can be more rapidly made by removing it. Let the trains be properly wound up. Adjust one of the screws $h$ in cylinder-head B², Fig. 10, Plate 2, and Fig. 2, Plate 2, against plate H, so that it shall cause the lever K to move flexible arm $n^2$ horizontally, and consequently turn hands $a^1 a^1$ on dial A to indicate the hour of departure of the first train of the four. Having done so, set off the train of wheels A, Fig. 3, Plate 3, by pulling horizontal rod $y'$, Fig. 3, when cylinder B¹, Fig. 2, Plate 2, will revolve, bringing the next of the screws $h$ over the plate H, which must be adjusted, in the same manner as the first of screws $h$, to set the hands to the time of the next train, and so on until the adjustments of the four trains are completed. Having made the before-mentioned adjustments to produce indications at stated times, the next thing to do is to ascertain which of the reversible slats is required to operate to announce the character and destination of the first of the four trains and of each train in succession. Having done this, and having ascertained which of the pedals $x$ needs to be depressed in order to reverse the proper slat B, Fig. 1, Plate 1, one of the pins $d^{21}$, Fig. 2, should be placed in one of the movable pedal-pin bars $d^{12}$, Fig. 2, in a pin-hole which shall bring it over the pedal, which should be depressed by the revolution of cylinder B¹, Fig. 2, Plate 2, so as to reverse the proper indicating-slat, and so on until the slats which will, by the letters and words thereon, give the required information as to the four trains shall all be adjusted so they will be reversed by the action of said pins and pedals upon them. As at present adjusted, the instrument is ready to automatically indicate the time of departure and character and destination of the trains.

We will now watch its automatic operations, beginning with train D, Fig. 3, Plate 3, and it will be found that disk $d$ is carrying in its revolutions the arms $d^4$, which have already been so adjusted that their points around the periphery of disk $d$ mark the requisite time-divisions for the four trains. At the required hour one of the points of arms $d^4$ impinges against the edge of slide-catch $z^1$ on arbor $z$, train D, Fig. 3, causing arbor $z$ to rock in its bearings, performing at first a partial unlocking of train A, Fig. 3, by the lifting movement of the bent elbow-shaped wire $z^2$ attached to the end of arbor $z$ acting upon the ordinary striking part, unlocking devices in train A. Shortly after the usual preliminary alarm-sound in train A, the point of arm $d^4$ fully lifts up catch $z^1$ and unlocks train A.

The before-described partly and finally complete unlocking of train A is provided for, so that, at the instant train A begins its movements, the unlocking devices in it shall have fallen back to their normal positions, and the stop-levers in train A be unhindered in their operations of dropping into the slots in the edge of disk $b$, train A, Fig. 3, at the proper time. If, on the contrary, arm $d^4$ should retain its hold too long upon catch $z^1$, the contrary effect would be produced, and train A would not be stopped at the required moment.

The unlocking of train A, Fig. 3, having been accomplished by the action of the devices hereinbefore mentioned, it and cylinder B¹, Fig. 2, Plate 2, to which train A is geared, continue to move together until one of the bars B⁵ (carrying a bar, $d^{12}$, Fig. 2, in which pins $d^{21}$ are held) is carried around cylinder B¹ until a pin, $d^{21}$, is brought to bear vertically upon one of the pedals $x x x$ under said cylinder, and with it one of vertical rods $x' x' x'$. This rod $x'$, so acted upon, and being connected to one of the horizontal rods $y y y$, Fig. 2, by arm $m$, causes rod $y$ to rock, and that carries with it one of the geared sectors $q$, which, being geared into one of the pivoted pinions $c c c$ on the end of reversible slats B B B, Fig. 1, Plate 1, causes, by its rocking movement, one of slats B to reverse, and show upon the side thus brought to view the words printed or written upon it which indicate the character and destination of the train to leave next after this announcement. When the next train is announced, and the pedal which announced the last train is free to rise, by the pin $d^{11}$ having passed off from it, the spring on the rear end of geared sector $q$ causes the rod to which the sector is attached to rock back as it was before the pedal was pressed down, and this motion reverses the slat and conceals the announcement first made.

Simultaneously with the reversing of slat B the hands $a^1 a^1$, Fig. 1, on dial A are caused to assume positions which indicate the hour at which the said train should leave, by the action of lever K and flexible rack-arm $n^2$ upon train of wheels A′, Fig. 2, Plate 2, as follows, viz: Screws $h$ are placed in the rim of head $B^2$, on cylinder $B^1$, Fig. 2, in a line with the bars $B^5$, which project beyond the face of said rim. As cylinder $B^1$ revolves, the projecting end of one of screws $h$ impinges upon plate H under head $B^2$, pressing it down, and with it slotted piston $i$, which is attached to its under side, and which moves in socket $j$ in shelf L. The lower short arm of lever K, which has its fulcrum near the upper side of shelf L, projects into the slot in piston $i$, and when plate H is depressed, bearing piston $i$ upon said short arm of lever K, the top end of the latter is thrown toward train A′, Fig. 2, and carrying its flexible rack-arm $n^2$ against its connecting-pinion in train A′, and thus setting pointers $a^1 a^1$ in the positions that shall indicate the hour of the departure of the train named on the slats B, and so the above-described movements are successively effected as the time for the departure of each train arrives and passes.

Lever K is moved toward train A′, as described, and from it, by spiral spring $f$, as screw $h$ passes off from plate H, leaving it free to rise up. Should a train from a distant point, which is to pass the station where the instrument is located, be behind its time, the hands on the dial can, by screwing arm G against lever K, Fig. 2, be arbitrarily set to indicate the time at which the late train will leave. After having so set the hands, rod $c^{11}$, Fig. 3, (its end reaching through the side of the case,) should be pulled. This, through its connection with the lower end of bifurcated lever $n$, Fig. 3, and thence with disk $d$, Fig. 3, through the grooved screw-nut $d^2$, causes disk $d$ and arms on it, $d^4$, to move horizontally on its arbor, and the points of arms $d^4$ to pass beyond the edge of slide-catch $z^1$ on rocking arbor $z$, so that as disk $d$ revolves by train D, Fig. 3, they cannot unlock train A, Fig. 3, although train D keeps up its regular movements. As soon as the late train shall have left the indicator-station the instrument is again thrown into gear, ready to properly indicate the succeeding train, by pushing back rod $c^{11}$, drawing arm G away from lever K, and causing cylinder $B^1$ to revolve, by pulling rod $y'$, Fig. 3, as it would have done had the train been on time and the operations of the instrument been left undisturbed.

The instrument will now resume its regular automatic functions, and announce the departure of the trains for which it may have been set.

Having thus described my invention, what I claim is—

1. In an automatically-operating time-table annunciator, the combination of the time-train D, Fig. 3, moving train A, Fig. 3, Plate 3, cylinder $B^1$, Fig. 2, geared train A′, Fig. 2, Plate 2, hands $a^1 a^1$, dial A, reversible sign-slats B, and their connecting devices, substantially as and for the purpose set forth.

2. In an automatically-operating instrument for the purposes specified, a time-train, D, Fig. 3, Plate 3, in combination with arbor $d^1$, Fig. 3, disk $d$, arms $d^4$, nut $d^2$, catch-arbor $z$, slide-catch $z^1$, elbow-shaped wire $z^2$ on arbor $z$, and a moving train, A, Fig. 3, Plate 3, substantially as and for the purpose set forth.

3. The combination of the moving train A, Fig. 3, Plate 3, and skeleton cylinder $B^1$, Fig. 2, Plate 2, operating together, substantially as and for the purpose set forth.

4. The combination of skeleton cylinder $B^1$, Fig. 2, Plate 2, piston $i$, lever $k$, flexible rack-arm $n^2$, geared train A′, Fig. 2, Plate 2, hands $a^1 a^1$, dial A, spiral springs $r$ and $f$, pedals $x$, rods $x'$ and $y$, arms $m$, sectors $q$, and rotating reversible sign-slats B, substantially as and for the purposes specified.

5. The combination, in train D, Fig. 3, of arbor $d^{10}$ and its gear-connection with said train, disk $d$, arms $d^4$, nut $d^2$, lever $n$, rod $c^{11}$, arbor $z$, slide-catch $z^1$, and bent arm $z^2$, as and for the purposes specified.

6. The combination, with train A, Fig. 3, of the disk $b$, Fig. 9, Plate 1, with its slots $b^2$ cut at equal intervals, and rod $y'$ and its connecting-elbow, and vertical trip-rod, substantially as and for the purpose set forth.

7. The combination, in skeleton cylinder $B^1$, Fig. 2, Plate 2, of the heads $B^2$ and $B^3$, bars $B^5$, pedal-pin bars $d^{12}$, pins $d^{21}$, spring $g$, and adjusting-screws $h$, substantially as and for the purpose set forth.

8. The combination of piston $i$, Fig. 2, lever $k$, flexible rack-arm $n^2$, and spiral springs $f$ and $o$, substantially as and for the purpose set forth.

9. The bent arm G and its adjusting-screw P, substantially as and for the purpose set forth.

10. The combination of the pedals $x$, rods $x'$, horizontal rods $y$, arms $m$, and sectors $q$, substantially as and for the purpose set forth.

11. The rotating reversible sign-slats B, Fig. 1, substantially as and for the purpose set forth.

12. The disk $d$, Fig. 4, with its adjustable arms $d^4$, and nut $d^2$, as and for the purpose specified.

13. The arms $d^2$, Figs. 5 and 6, with their pins $c$ and slot $c'$, substantially as and for the purpose set forth.

14. The pedals $x$, vertical rods $x'$, horizontal rods $y$, and geared sectors $q$, in combination with the reversible sign-slats B, reversed by spring-action following the action of the sectors $q$, substantially as and for the purpose set forth.

15. The cylinder-head $B^2$, Fig. 10, with its projecting rim and its adjusting-screws $h$, substantially as and for the purpose set forth.

16. The disk $b$, Fig. 9, with its slots and latches $a^5$, substantially as and for the purpose set forth.

17. The pedal-pin bar $d^{12}$, Fig. 8, with its perforations $d^1$, Fig. 2, and the adjustable pins $d^{21}$, substantially as and for the purpose set forth.

18. Arbor $z$, Fig. 3, with its adjustable slide-catch $z^1$, and bent arm $z^2$, substantially as and for the purpose set forth.

19. The skeleton cylinder $B^1$, having removable pedal-pin bars $d^{12}$, as and for the purpose set forth.

20. The combination of train A, Fig. 3, of disk $b$, Fig. 9, and skeleton cylinder $B^1$, Fig. 2, Plate 1, substantially as and for the purpose set forth.

21. Disk $d$, train D, Fig. 3, arms $d^4$, nut $d^2$, bifurcated lever $n$, and rod $c''$, combined, as and for the purpose set forth.

22. The combination of the partial and fully unlocking devices in train A, Fig. 3, with disk $b$, Fig. 9, the bent arm $z^2$, arbor $z$, slide-catch $z^1$, disk $d$, arms $d^2$, arbor $d^1$, and train D, Fig. 3, substantially as and for the purpose set forth.

LEWIS DART.

Witnesses:
W. H. CHAPIN,
D. P. LILLIE.